(12) United States Patent
Guarino et al.

(10) Patent No.: US 11,754,169 B1
(45) Date of Patent: Sep. 12, 2023

(54) LUBRICATION AND COOLING OIL DISTRIBUTION SYSTEM FOR A VEHICLE TRANSAXLE

(71) Applicant: FORD GLOBAL TECHNOLOGIES, LLC, Dearborn, MI (US)

(72) Inventors: William David Guarino, Franklin, MI (US); Bharath Madduri, Canton, MI (US); Derek Kinch, Ypsilanti, MI (US); Kyle Ogrodzinski, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/859,776

(22) Filed: Jul. 7, 2022

(51) Int. Cl.
*F16H 57/04* (2010.01)
(52) U.S. Cl.
CPC ..... *F16H 57/0424* (2013.01); *F16H 57/0417* (2013.01); *F16H 57/0471* (2013.01); *F16H 57/0476* (2013.01); *F16H 57/0483* (2013.01)
(58) Field of Classification Search
CPC ............ F16H 57/0417; F16H 57/0424; F16H 57/0471; F16H 57/0476; F16H 57/0483
See application file for complete search history.

(56) References Cited

U.S. PATENT DOCUMENTS

| | | | |
|---|---|---|---|
| 10,124,756 B2 * | 11/2018 | Nakajima | F02B 63/04 |
| 10,697,534 B2 * | 6/2020 | Guarino | F16H 57/0457 |
| 10,816,082 B2 * | 10/2020 | Alexiou | F16H 57/0473 |
| 10,920,871 B2 * | 2/2021 | Kita | F16H 57/0483 |
| 10,989,297 B2 * | 4/2021 | Guarino | F16H 1/28 |
| 11,073,235 B2 * | 7/2021 | Kiyokami | B29C 66/547 |
| 11,287,026 B2 * | 3/2022 | Umeki | F16H 57/045 |
| 11,506,094 B2 * | 11/2022 | Kiyokami | F16H 57/0421 |
| 2008/0164100 A1 * | 7/2008 | Iraha | F16H 57/0424 184/6.4 |
| 2015/0285368 A1 * | 10/2015 | Mclauchlan | F16H 57/046 184/6.12 |
| 2016/0144864 A1 | 5/2016 | Deutsch et al. | |
| 2017/0114886 A1 | 4/2017 | Matsushita et al. | |
| 2017/0210315 A1 | 7/2017 | Nakajima et al. | |

* cited by examiner

*Primary Examiner* — Adam D Rogers
(74) *Attorney, Agent, or Firm* — Vincent Mastrogiacomo; Brooks Kushman P.C.

(57) ABSTRACT

A vehicle transaxle includes a housing, an electric machine, and rotating components. The housing defines an internal cavity, a first channel, and a second channel. The first and second channels branch from a common inlet. The electric machine and rotating components are disposed within the internal cavity. The first channel is configured to deliver fluid to the electric machine for cooling. The second channel is configured to deliver the fluid to the rotating components for lubrication. The cooling channel is sized relative to the lubrication channel such that the fluid is biased from the inlet and toward the second channel in response to a temperature of the fluid being less than a threshold and is biased from the inlet and toward the first channel in response to the temperature of the fluid being greater than the threshold.

20 Claims, 5 Drawing Sheets

LUBRICATION AND COOLING OIL DISTRIBUTION SYSTEM FOR A VEHICLE TRANSAXLE

TECHNICAL FIELD

The present disclosure relates to powertrain systems for vehicles including axles configured to transfer power to drive wheels.

BACKGROUND

Vehicles include powertrain systems that are configured to transfer power from power generating devices, such as internal combustion engines or electric machines, to drive wheels of the vehicle.

SUMMARY

A vehicle includes a transaxle and a plurality of bearings. The transaxle has a housing, an electric machine, a plurality of gears, and a plurality of bearings. The housing defines an internal cavity. The electric machine is disposed within the internal cavity. The plurality of gears is disposed within the internal cavity. The plurality of bearings is disposed within the internal cavity. The housing defines a lubrication channel configured to deliver fluid to lubricate the plurality of gears and the plurality of bearings. The housing further defines a cooling channel configured to deliver the fluid to cool the electric machine. The lubrication and cooling channels have a common inlet that branches into the lubrication and cooling channels. The cooling channel is sized relative to the lubrication channel. A cross-sectional area of the cooling channel is smaller than a cross-sectional area of the lubrication channel. An orifice plate is disposed within the lubrication channel. The fluid is biased toward the lubrication channel in response to a temperature of the fluid being less than a threshold. The fluid is biased toward the cooling channel in response to the temperature of the fluid being greater than the threshold.

A vehicle transaxle includes a housing, an electric machine, bearings, and an orifice plate. The housing defines an internal cavity, a lubrication channel, a cooling channel, and a common inlet configured to simultaneously deliver fluid to the lubrication and cooling channels. The electric machine is disposed within the internal cavity. An outlet of the cooling channel is configured to direct the fluid to the electric machine to cool the electric machine. The bearings are disposed within the internal cavity. An outlet of the lubrication channel is configured to direct the fluid to the bearings to lubricate the bearings. The orifice plate is disposed within the lubrication channel. The cooling channel is sized relative to the lubrication channel and the orifice plate is positioned such that a majority of the fluid flows toward the lubrication channel in response to a temperature of the fluid being less than a threshold and flows toward the cooling channel in response to the temperature of the fluid being greater than the threshold.

A vehicle transaxle includes a housing, an electric machine, and rotating components. The housing defines an internal cavity, a first channel, and a second channel. The first and second channels branch from a common inlet. The electric machine and rotating components are disposed within the internal cavity. The first channel is configured to deliver fluid to the electric machine for cooling. The second channel is configured to deliver the fluid to the rotating components for lubrication. The cooling channel is sized relative to the lubrication channel such that the fluid is biased from the inlet and toward the second channel in response to a temperature of the fluid being less than a threshold and is biased from the inlet and toward the first channel in response to the temperature of the fluid being greater than the threshold.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
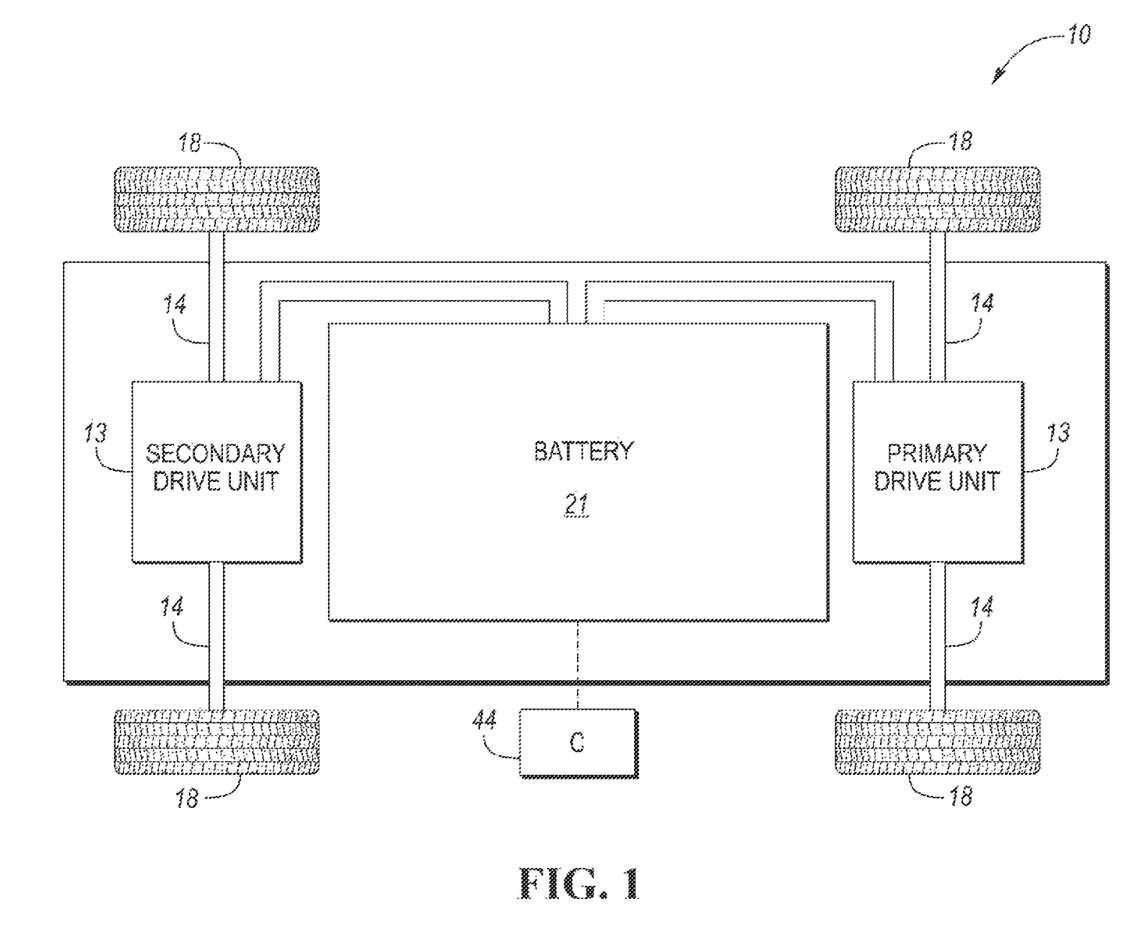
FIG. 1 is a schematic diagram illustrating a vehicle and a vehicle powertrain.

Referring to FIG. 1, a powertrain of a motor vehicle 10 includes a one or more transaxles 13 for producing multiple forward drive speed ratios and reverse drive. Halfshaft 14 transmit rotating power between each transaxle's output and drive wheels 18. The transaxles 13 may include differentials that transfer torque and/or power to the drive wheels 18. The gearing arrangements of the differentials may be arranged such that the wheels on a single axle may rotate at different speeds. The various components of the powertrain may be connected to each other via constant-velocity joints (not shown) to compensate for rotating components that are not axially aligned.

The transaxles 13 may further include power generators that are configured to generate torque and power within the powertrain, such as electric motors or electric machines. The electric machines may be configured to draw power from a battery 21 via inverting circuitry (not shown) to propel the vehicle 10. The electric machines may be configured to deliver power to the battery 21 via the inverting circuitry to charge the battery 21. The electric machine may recharge the battery 21 during regenerative braking or while being powered by another power source, such as an engine 12.

The various components of the powertrain may be controlled by controller 44. While illustrated as one controller, the controller 44 may be part of a larger control system and may be controlled by various other controllers throughout the vehicle 10, such as a vehicle system controller (VSC). It should therefore be understood that the controller 44 and one or more other controllers can collectively be referred to as a "controller" that controls various actuators in response to signals from various sensors to control functions the vehicle 10 or vehicle subsystems. The controller 44 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 44 in controlling the vehicle 10 or vehicle subsystems.

Control logic or functions performed by the controller 44 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 44. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The powertrain illustrated in FIG. 1 is meant for illustrated purposes. The transaxle 13 may be included in any hybrid configuration that includes an additional power generator (e.g., engine 12 or fuel cell) or may be a standalone unit that powers an axle of an electric only vehicle. Furthermore, it should be understood that the vehicle configuration described herein is merely exemplary and is not intended to be limited. Other electric or hybrid vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Figure 2:
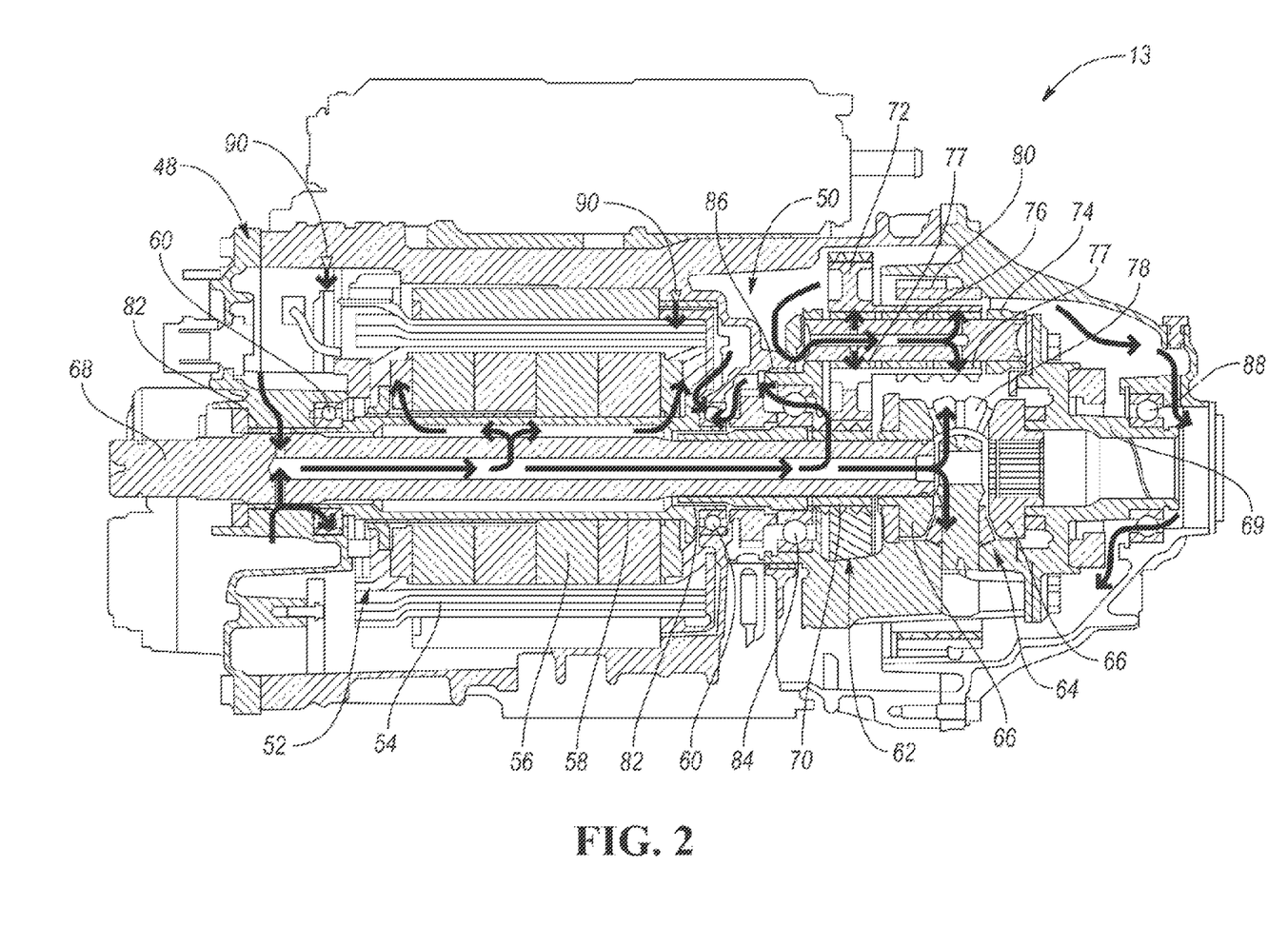
FIG. 2 is a cross-sectional view illustrating the internal components of a transaxle.
Figure 3:
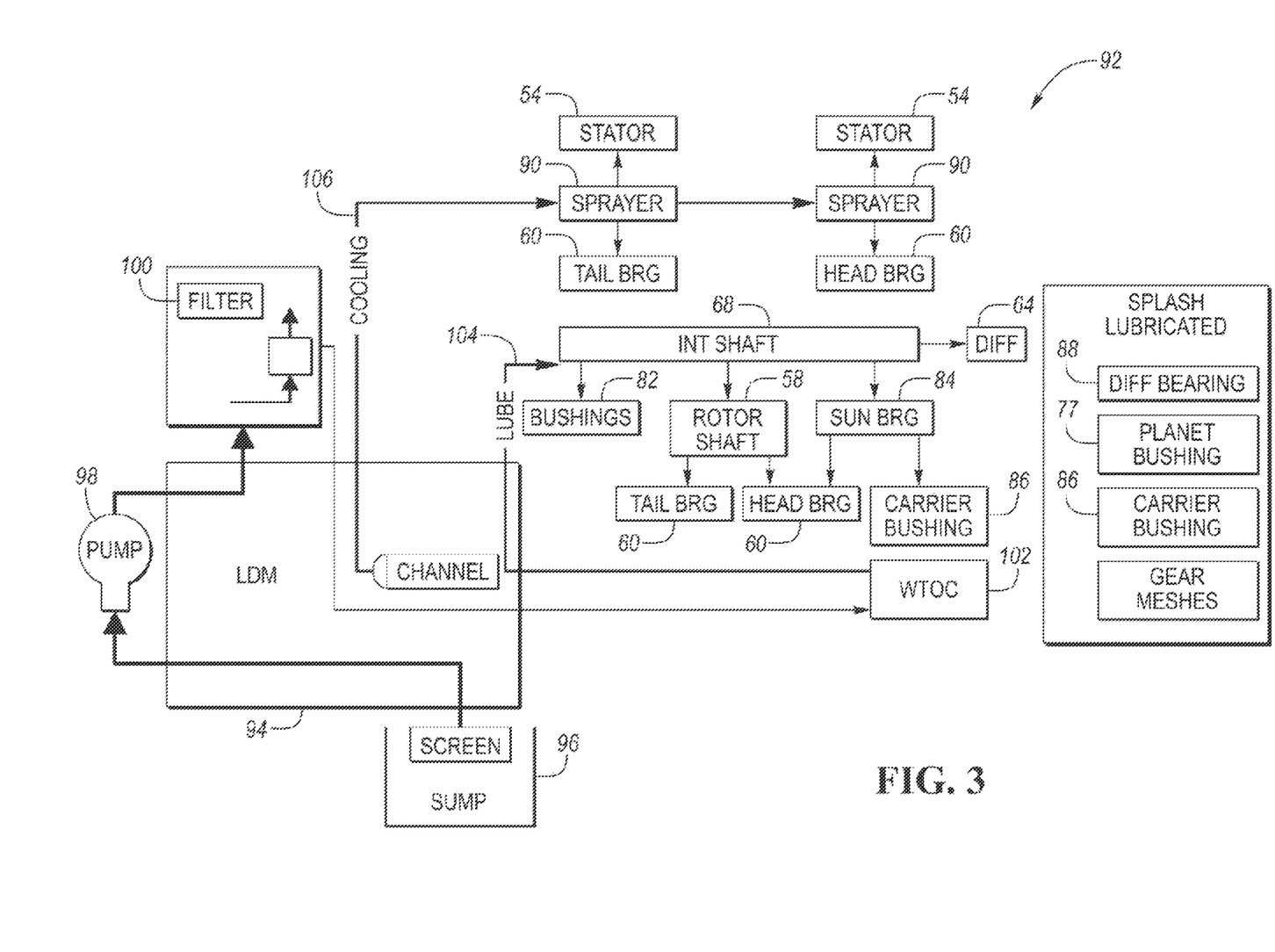
FIG. 3 is diagram illustrating fluid distribution and flow paths associated the transaxle.

Referring to FIGS. 2 and 3, the transaxle 13 and various subcomponents of the transaxle 13 are illustrated. The transaxle 13 includes a housing 48 defining an internal cavity 50. An electric machine 52 (e.g., a motor or a motor/generator combination) is disposed with the internal cavity 50. Various rotating components (e.g., shafts, gears, roller bearings, carriers, the rotor of the electric machine 52, etc.) are disposed within the internal cavity 50. Various non-rotating components (e.g., bushings, the stator of the electric machine 52, etc.) are also disposed within the internal cavity 50. Bushings may more specifically be non-rotating bearings that support a rotating component (e.g., a journal of a rotating shaft) or may be a bearing that is part of a rotating component (e.g., a hollow shaft), but allows for relative movement between the bushing a rotating part supported by the bushing (e.g., a journal of a rotating shaft).

The components disposed within the internal cavity 50 may more specifically include a stator 54 of the electric machine 52; a rotor 56 of the electric machine 52; a shaft 58 that is secured to the rotor 52; bearings 60 supporting the rotor 56 and shaft 58; a planetary gear 62 system; and a differential 64. The differential 64 includes two output gears 66. Shaft 58 may be referred to as the rotor shaft. One of the output gears 66 is connected to output shaft 68 and the other is connected to output shaft 69. The output shafts 68, 69 may each be connected to a drive wheel via a half shaft. The differential 64 is connected to shaft 58 via the planetary gear 62 system. More septically, shaft 58 is secured to a sun gear 70 of the planetary gear system 62. The sun gear 70 engages planet gears 72 that are connected to a carrier 74 via pins 76 supported by bushings 77. Bushing 77 may be referred to as planet bushings. Spider gears 78 that engage the output gears 66 are rotatably secured to the carrier 74. The planet gears 72 engage a ring gear 80 defined along the interior of the housing 48 to provide a reaction force to the planetary gear system 62.

The output shaft 68 is supported by bushings 82. One of the bushings 82 is secured the housing 48 while the other is secured to the sun gear 70. The sun gear 70 is supported by bearing 84. The carrier 74 is affixed to output shaft 69. The carrier 74 and output shaft 69 combination is supported at a first end by bearing 84 and bushing 86 and is supported at a second end by bearing 88. The two bearings 60 may be referred to as head and tail bearings, bearing 84 may be referred to as the sun bearing, bushing 86 may be referred to as the carrier bushing, and bearing 88 may be referred to as the differential bearing.

Sprayers 90 may be disposed within the internal cavity 50. Alternatively, the sprayers 90 may be defined by the housing 48 and configured to direct fluid into the internal cavity 50. The sprayers 90 may more specifically be configured to direct fluid onto the stator 54 of the electric machine 52 to cool the stator 54. The sprayers may also direct the fluid to the rotor 52 and bearings 60.

Referring to FIGS. 2-5, a fluid distribution system and flow paths 92 associated with the transaxle 13 are illustrated. A portion of the fluid flow paths 92 are defined by the housing 48. More specifically, a portion of the fluid flow paths 92 are defined between the housing 48 and a lube distribution manifold 94. Other portions of the fluid flow paths 92 may be defined by the housing 48 alone, the lube distribution manifold 94, or any of the other component of the transaxle 13. For example, the dashed arrows in FIG. 2 illustrate the flow of the fluid within the internal cavity 50 of the housing 48. Fluid, such as transmission or hydraulic fluid, is circulated through the transaxle 13 for the purpose of lubrication and cooling. Some of the fluid flow paths 92 may be dedicated to cooling various components (e.g., stator 54) while others may be dedicated to lubricating components where relative movement between various components (e.g., shafts, gears, bearings, carriers, the rotor of the electric machine 52, bushings, etc.) occurs.

The oil or fluid within the transaxle 13 is directed out of a sump 96 via a pump 98 and to a filter 100. The fluid in then directed to a heat exchanger 102. The heat exchanger 102 may air cool the fluid or may cool the fluid via exchanging heat with another fluid system of the vehicle 10. If the heat exchanger 102 exchanges heat with another fluid system of the vehicle 10, the heat exchanger 102 may be referred to as a water to oil cooler. After the fluid then exits the heat exchanger 102, the path of the fluid splits into two fluid flow paths, one of which is a lubrication channel 104 and the other of which is a cooling channel 106. It is noted that the components in FIG. 5 that appear to be solid are representative of the voids or spaces that form the lubrication channel 104, cooling channel 106, and other associated channels.

The lubrication channel 104 is configured to deliver fluid lubricate the various components (e.g., shafts, gears, bearings, carriers, the rotor of the electric machine 52, bushings, etc.) of the transaxle 13 while the cooling channel 106 is configured to deliver fluid to cool various components of the transaxle 13 (e.g., stator 54 of the electric machine 52). The lubrication channel 104 may more specifically be configured to deliver fluid to lubricate the output shaft 68, bushings 82, rotor shaft 58, sun bearing 84, bearings 60, and carrier bushing 86 according to the paths illustrated by arrows in FIGS. 2 and 3. The cooling channel 106 may more specifically be configured to deliver fluid to the sprayers 90, which deliver the fluid to cool the stator 54, rotor 52, and bearings 60 according to the paths illustrated by arrows in FIGS. 2 and 3. The sprayers 90 may include nozzles that increase the speed of the fluid, which in turn increases the heat being exchanged to the fluid, increasing the cooling of the various components of the transaxle 13. Other components (e.g., the differential bearing 88, planet bushings 77, carrier bushing 86, meshing between gears, etc.) may lubricated by the splashing of fluid via various moving components within the internal cavity 50. However, some fluid may flow to these other components via the lubrication channel 104 or cooling channel 106.

Figure 4:
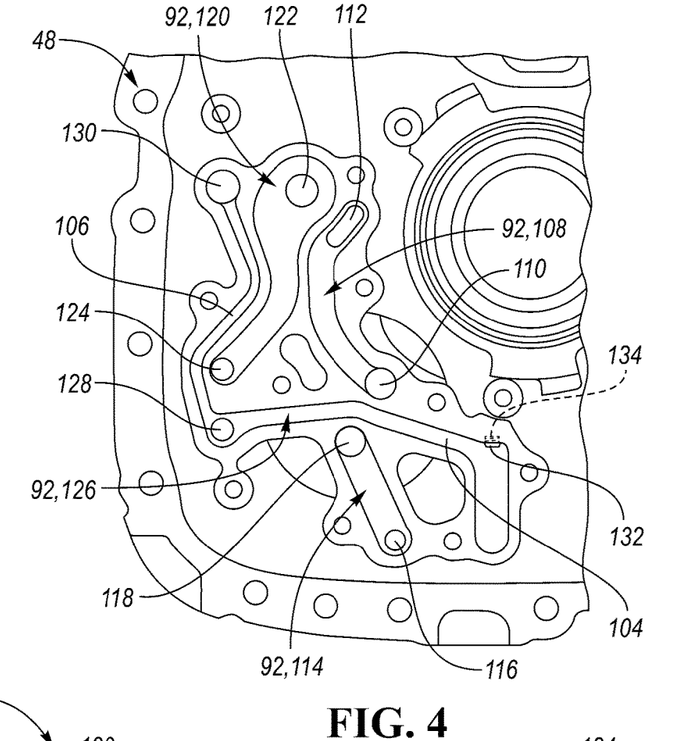
FIG. 4 is an exterior face of a housing of the transaxle that engages a lube distribution manifold to form portions of the fluid flow paths.

A first 108 of the fluid paths 92 defined between the housing 48 and a lube distribution manifold 94 extends from an outlet 110 of the pump 98 to an inlet 112 to the filter 100. The outlet 110 of the pump 98 and the inlet 112 to the filter 100 are each defined by the housing 48. A second 114 of the fluid paths 92 defined between the housing 48 and a lube distribution manifold 94 extends from an outlet 116 of the sump 96 to an inlet 118 to the pump 98. The outlet 116 of the sump 96 is defined by the lube distribution manifold 94 while the inlet 118 to the pump 98 is defined by the housing 48. A third 120 of the fluid paths 92 defined between the housing 48 and a lube distribution manifold 94 extends from an outlet 122 of the filter 100 to an inlet 124 to the heat exchanger 102. The outlet 122 of the filter 100 is defined by the housing 48 while the inlet 124 to the heat exchanger 102 is defined by the lube distribution manifold 94.

A fourth 126 of the fluid paths 92 defined between the housing 48 and the lube distribution manifold 94 extends from an outlet 128 of the heat exchanger 102 and branches into the lubrication channel 104 and the cooling channel 106. The outlet 128 of the heat exchanger 102 is a common inlet to the lubrication channel 104 and the cooling channel 106 that is configured to simultaneously deliver fluid to the lubrication channel 104 and the cooling channel 106. The outlet 128 of the heat exchanger 102 is defined by the lube distribution manifold 94. The cooling channel 106 also has an outlet 130 that is defined by the lube distribution manifold 94 while the lubrication channel 104 has an outlet 132 that is defined by the housing 48. The outlet 130 of the cooling channel 106 is configured to deliver fluid to cool various components of the transaxle 13 (e.g., stator 54 of the electric machine 52, rotor 56 of the electric machine 52, bearings 60, etc.). The outlet 132 of the lubrication channel 104 is configured to deliver fluid to lubricate the various components (e.g., shafts, gears, bearings, carriers, the rotor of the electric machine 52, bushings, etc.) of transaxle 13.

Figure 5:
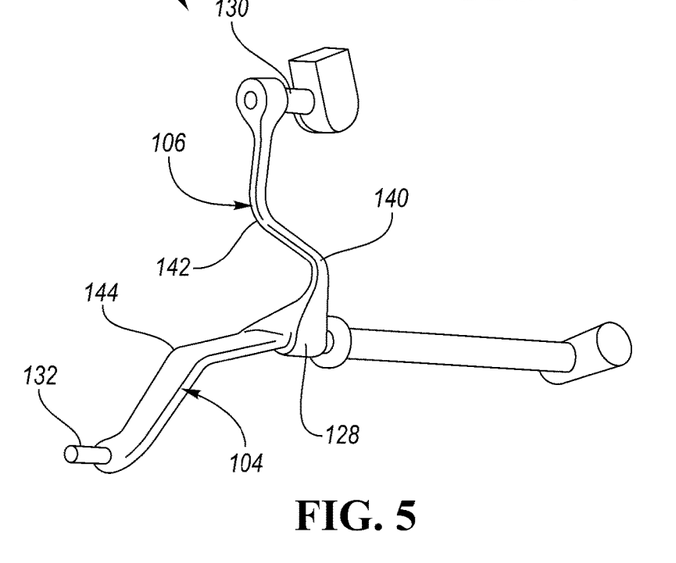
FIG. 5 illustrates a portion of the fluid flow paths that includes a cooling channel and a lubrication channel.
Figure 6:
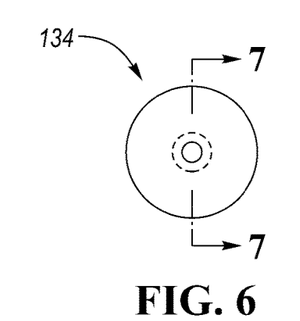
FIG. 6 is a front view of an orifice plate.
Figure 7:
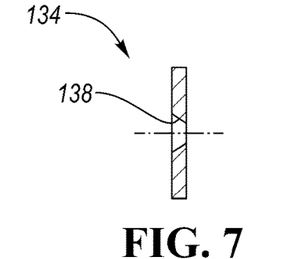
FIG. 7 is a cross-sectional view taken along lien 7-7 in FIG. 6.

The cooling channel 106 is sized relative to the lubrication channel 104, and a restrictor orifice 134 is defined within the lubrication channel 104. The restrictor orifice 134 may be defined in a restrictor plate that is disposed within the lubrication channel 104 or may be defined by the housing 48. The configuration of the cooling channel 106 and the lubrication channel 104 results in a varying fluid resistance at different temperatures such that the fluid is biased toward the lubrication channel in response to a temperature of the fluid being less than a threshold and is biased toward the cooling channel in response to the temperature of the fluid being greater than the threshold. More specifically, the cross-sectional area of the cooling channel 106 may be smaller relative to the cross-sectional area of the lubrication channel 104 and/or the length of the cooling channel 106 may be sufficient long in length or longer than the length of the lubrication channel 104, and the restrictor orifice 134 may positioned within the lubrication channel 104 such that a majority of the fluid flowing in the fourth 126 of the fluid paths 92 flows toward the lubrication channel 104 in response to a temperature of the fluid being less than a threshold and flows toward the cooling channel 106 in response to the temperature of the fluid being greater than the threshold.

The combination of the narrow passage for the cooling channel 106 and defining the restrictor orifice 134 in the lubrication channel 104 creates a distribution system where the proportion of fluid dedicated to cooling decreases with temperature. At lower temperatures, the narrow passage of the cooling channel 106 is restrictive, biasing the fluid towards the lubrication channel 104. At high temperatures, the narrow passage of the cooling channel 106 is less restrictive than the restrictor orifice 134, biasing the fluid towards cooling channel 106. Also at high temperatures, less power is required to pump oil, so total flow can be increased, resulting in cooling flow that increases with oil temperature while the lubrication flow remains relatively stable. Such a system allows for variable flow to the lubrication channel 104 and to the cooling channel 106 based on need according to the fluid temperature; eliminates the need for a valve system and corresponding control system; and reduces excessive power use of the pump 98 at low fluid temperatures.

Under a fixed temperature flow scenario (i.e., where the temperature of the fluid flowing through channel does not change), the resistance of the fluid flowing through a channel is proportional to a length of the channel (e.g., the cooling channel 106 or the lubrication channel 104) and is inversely proportional to a cross-section area of the channel. More specifically, under a fixed temperature flow scenario, the resistance of the fluid flowing through the cooling channel 106 is influenced by the cross-sectional area of the cooling channel 106 and length of the cooling channel 106. On the other hand, due to the placement of the restrictor orifice 134 within the lubrication channel 104, the resistance of the fluid flowing through the lubrication channel 104 under a fixed temperature flow scenario is only due to the restrictor orifice 134 and is influenced by the cross-sectional area of the lubrication channel 104.

Under a variable temperature flow scenario (i.e., where the temperature of the fluid flowing through channel does change), the resistance of the fluid flowing through a channel is proportional to a length of the channel, is proportional to kinematic viscosity of the fluid flowing through the channel, and is inversely proportional to a cross-section area of the channel. More specifically, under a variable temperature flow scenario, the resistance of the fluid flowing through the cooling channel 106 is influenced by the cross-sectional area of the cooling channel 106, length of the cooling channel 106, and kinematic viscosity of the fluid flowing through the cooling channel 106. On the other hand, due to the placement of the restrictor orifice 134 within the lubrication channel 104, the resistance of the fluid flowing through the lubrication channel 104 under a variable temperature flow scenario is only due to the restrictor orifice 134, and is influenced by the cross-sectional area of the lubrication channel 104 and the kinematic viscosity of the fluid flowing through the lubrication channel 104.

The resistance of the fluid flowing through the cooling channel 106 may be represented by relationship (1):

$$R_1 \propto \frac{\mu L}{A_1} \quad (1)$$

where ∝ represents a proportional relationship, $R_1$ is the resistance of the fluid flowing through the cooling channel 106, μ is the kinematic viscosity of the fluid flowing through the cooling channel 106, L is the length of the cooling channel 106, and A is the cross-sectional area of the cooling channel 106.

The resistance of the fluid flowing through the lubrication channel 104 may be represented by relationship (2):

$$R_2 \propto \frac{\mu}{A_2} \quad (2)$$

where ∝ represents a proportional relationship, $R_2$ is the resistance of the fluid flowing through the lubrication channel 104, μ is the kinematic viscosity of the fluid flowing through the lubrication channel 104, and $A_2$ is the cross-sectional area of the lubrication channel 104.

The resistances, $R_1$ and $R_2$ are modeled such that at hot temperatures (e.g., temperatures that are greater than a threshold), the fluid flowing thought the cooling channel 106 and the lubrication channel 104 will have a relatively low kinematic viscosity so that the resistance in the cooling channel 106 will be less resistive than resistance in the lubrication channel 104. The resistances, $R_1$ and $R_2$ are also modeled such that at cold temperatures (e.g., temperatures that are less than a threshold), the fluid flowing though the cooling channel 106 and the lubrication channel 104 will have a relatively high kinematic viscosity so that the resistance in the lubrication channel 104 will be less resistive than resistance in the cooling channel 106.

Referring to FIG. 4-7, the restrictor orifice 134 may be a sharp-edged orifice, where the orifice 134 has chamfer 138 such that the diameter of orifice increases in direction of the flow of the fluid. The restrictor orifice 134 may more specifically be defined at the outlet 132 of the lubrication channel 104. The cooling channel 106 may bend at a first position 140 in a first radial direction. The cooling channel 106 may also bend at a second position 142 in a second radial direction that is opposite of the first radial direction. The lubrication channel 104 may also bend at a first position 144.

Figure 8:
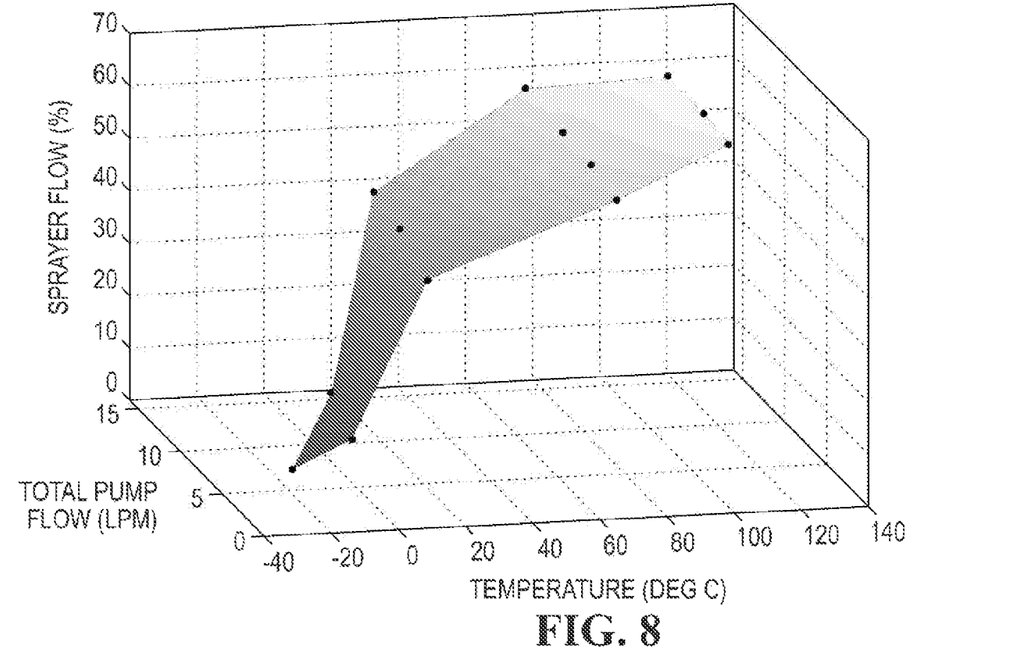
FIGS. 8 and 9 are graphs of surfaces illustrating a percentage of the fluid flow that is directed toward sprayers for cooling relative to fluid temperature and fluid pump flow.
Figure 9:
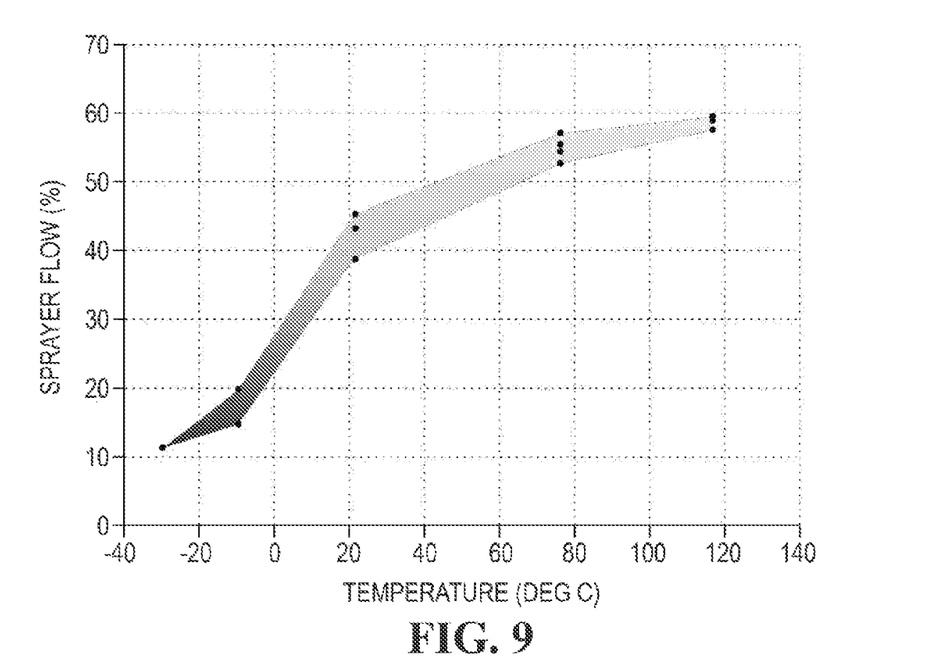

Referring to FIGS. 8 and 9, graphs of surfaces representing a percentage of the fluid flow that is directed toward sprayers for cooling relative to fluid temperature and fluid pump flow is illustrated. More specifically, the graphs illustrate the percentage of fluid flow that is directed toward the cooling channel 106 as opposed to the lubrication channel 104 within the fourth 126 of the fluid paths 92. One hundred minus the percentage of fluid flow illustrated in FIGS. 8 and 9 may represent the percentage of fluid flow that is directed toward the lubrication channel 104 as opposed to the cooling channel 106 within the fourth 126 of the fluid paths 92. The graphs illustrate that as the temperature of the fluid increases, the flow though the cooling channel 106 increases while the flow through the lubrication channel 104 decreases.

A majority of the fluid is biased toward the cooling channel 106 in the fourth 126 of the fluid paths 92 for any value of flow depicted in FIGS. 8 and 9 that is greater than fifty percent. A majority of the fluid is biased toward the lubrication channel 104 in the fourth 126 of the fluid paths 92 for any value of flow depicted in FIGS. 8 and 9 that is less than fifty percent. Fifty percent, therefore, may be representative of the threshold where it switches from the fluid be biased toward the lubrication channel 104 to being biased toward the cooling channel 106.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
a transaxle having:
a housing defining an internal cavity,
an electric machine disposed within the internal cavity,
a plurality of gears disposed within the internal cavity, and
a plurality of bearings disposed within the internal cavity, wherein the housing defines (i) a lubrication channel configured to deliver fluid to lubricate the plurality of gears and the plurality of bearings and (ii) a cooling channel configured to deliver the fluid to cool the electric machine, wherein the lubrication and cooling channels have a common inlet that branches into the lubrication and cooling channels, and wherein (i) the cooling channel is sized relative to the lubrication channel and (ii) an orifice is defined within the lubrication channel such that the fluid (a) is biased toward the lubrication channel in response to a temperature of the fluid being less than a threshold and (b) is biased toward the cooling channel in response to the temperature of the fluid being greater than the threshold.

2. The vehicle of claim 1, wherein the orifice is chamfered.

3. The vehicle of claim 1, wherein the orifice is defined at an outlet of the lubrication channel.

4. The vehicle of claim 1, wherein the cooling channel bends at a first position in a first radial direction, and wherein the cooling channel bends at a second position in a second radial direction that is opposite of the first radial direction.

5. The vehicle of claim 1, wherein a cross-sectional area of the cooling channel is smaller than a cross-sectional area of the lubrication channel.

6. The vehicle of claim 1, wherein a length of the cooling channel is shorter than a length of the lubrication channel.

7. The vehicle of claim 1 further comprising a heat exchanger configured to cool the fluid, and wherein the common inlet is configured to receive the fluid from the heat exchanger.

8. A vehicle transaxle comprising:
a housing defining (i) an internal cavity, (ii) a lubrication channel, (iii) a cooling channel, and (iv) a common inlet configured to simultaneously deliver fluid to the lubrication and cooling channels;
an electric machine disposed within the internal cavity, wherein an outlet of the cooling channel is configured to direct the fluid to the electric machine to cool the electric machine;
bearings disposed within the internal cavity, wherein an outlet of the lubrication channel is configured to direct the fluid to the bearings to lubricate the bearings; and
an orifice plate is disposed within the lubrication channel, wherein (i) the cooling channel is sized relative to the lubrication channel and (ii) the orifice plate is positioned such that a majority of the fluid (a) flows toward the lubrication channel in response to a temperature of the fluid being less than a threshold and (b) flows toward the cooling channel in response to the temperature of the fluid being greater than the threshold.

9. The vehicle transaxle of claim 8, wherein the orifice plate defines a chamfered opening.

10. The vehicle transaxle of claim 8, wherein the orifice plate is disposed at the outlet of the lubrication channel.

11. The vehicle transaxle of claim 8, wherein the cooling channel bends at a first position in a first radial direction, and wherein the cooling channel bends at a second position in a second radial direction that is opposite of the first radial direction.

12. The vehicle transaxle of claim 8, wherein a cross-sectional area of the cooling channel is smaller than a cross-sectional area of the lubrication channel.

13. The vehicle transaxle of claim 8, wherein a length of the cooling channel is shorter than a length of the lubrication channel.

14. A vehicle transaxle comprising:
a housing defining (i) an internal cavity, (ii) a first channel, and (iii) a second channel, wherein the first and second channels branch from a common inlet;
an electric machine disposed within the internal cavity; and
rotating components disposed within the internal cavity, wherein (i) the first channel is configured to deliver fluid to the electric machine for cooling and (ii) the second channel is configured to deliver the fluid to the rotating components for lubrication, and wherein the cooling channel is sized relative to the lubrication channel such that the fluid (a) is biased from the common inlet and toward the second channel in response to a temperature of the fluid being less than a threshold and (b) is biased from the common inlet and toward the first channel in response to the temperature of the fluid being greater than the threshold.

15. The vehicle transaxle of claim 14, wherein an orifice is defined within the second channel, wherein the orifice further facilitates (i) biasing the fluid toward the second channel in response to the temperature of the fluid being less than the threshold and (ii) biasing the fluid toward the first channel in response to the temperature of the fluid being greater than the threshold.

16. The vehicle transaxle of claim 15, wherein the orifice is chamfered.

17. The vehicle transaxle of claim 15, wherein the orifice is defined at an outlet of the second channel.

18. The vehicle transaxle of claim 14, wherein the first channel bends at a first position in a first radial direction, and wherein the first channel bends at a second position in a second radial direction that is opposite of the first radial direction.

19. The vehicle transaxle of claim 14, wherein a cross-sectional area of the cooling channel is smaller than a cross-sectional area of the lubrication channel.

20. The vehicle transaxle of claim 14, wherein a length of the cooling channel is shorter than a length of the lubrication channel.

* * * * *